(12) United States Patent
Nies

(10) Patent No.: US 7,895,018 B2
(45) Date of Patent: Feb. 22, 2011

(54) EVENT MONITORING VIA COMBINATION OF SIGNALS

(75) Inventor: Jacob Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 11/836,976

(22) Filed: Aug. 10, 2007

(65) Prior Publication Data

US 2009/0039650 A1 Feb. 12, 2009

(51) Int. Cl.
*G06F 11/00* (2006.01)

(52) U.S. Cl. .................................................... 702/188

(58) Field of Classification Search .............. 702/60, 702/62, 65, 66, 67, 69, 74–77, 90, 96, 98, 702/99, 103, 104, 130, 138, 141, 142, 145, 702/182–184, 186, 188, 189, 191; 416/11, 416/61; 73/170.07

See application file for complete search history.

(56) References Cited

U.S. PATENT DOCUMENTS

| | | | |
|---|---|---|---|
| 6,925,385 B2 * | 8/2005 | Ghosh et al. ................ | 702/14 |
| 7,124,631 B2 | 10/2006 | Wobben | |
| 7,487,673 B2 * | 2/2009 | Ormel et al. ............ | 73/170.07 |
| 2005/0276696 A1 * | 12/2005 | LeMieux .................... | 416/61 |
| 2007/0140847 A1 * | 6/2007 | Martinez De Lizarduy Romo et al. ........................... | 416/11 |
| 2007/0154310 A1 | 7/2007 | Wobben | |

FOREIGN PATENT DOCUMENTS

| | | |
|---|---|---|
| DE | 10113039 A1 | 10/2002 |
| EP | 1531376 A | 5/2005 |
| GB | 2405492 A | 3/2005 |

OTHER PUBLICATIONS

Edgar Anahua, Stephan Barth, Joachim Peinke and Frank Boettcher, "Charachterization of the Wind Turbine Power Performance Curve by Stochastic Modeling", ForWind—Center for Wind Energy Research, University of Oldenburg, Germany, pp. 1-5.

(Continued)

*Primary Examiner*—Mohamed Charioui
(74) *Attorney, Agent, or Firm*—Global Patent Operation; Douglas D. Zhang

(57) ABSTRACT

A method for event monitoring for a wind turbine is described. The method includes measuring a first signal pattern representing a characteristic selected from a characteristic group, the characteristic group consisting of: a mechanical characteristic of a wind turbine, emitted noise of a wind turbine, emitted noise of a part of a wind turbine; power output of a wind turbine, surface conductivity of parts of a wind turbine, operational data of a wind turbine, temperature of parts of a wind turbine, outside temperature, wind velocity, wind direction, and outside air humidity or other weather conditions; measuring at least a second signal pattern representing a different characteristic selected from the characteristic group; analyzing the first and the second signal pattern or a combination of the first and the second analyzed signal pattern with an analyzing method, wherein analyzed data is generated; and evaluating the analyzed data, wherein the evaluation provides a result indicative for an event.

21 Claims, 3 Drawing Sheets

OTHER PUBLICATIONS

Alexander Rauh and Joachim Peinke, "A phenomenological model for the dynamic response of wind turbines to turbulent wind", Journal of wind engineering and industrial aerodynamics, Nov. 9, 2003, pp. 1-23.

Edgar Anahua, Frank Boettcher, Stephan Barth, Joachim Peinke and Matthias Lange, "Stochastic Analysis of the Power Output for a Wind Turbine", ForWind—Center for Wind Energy Research, University of Oldenburg, Germany, pp. 1-4.

European Search Report issued in connection with corresponding EP Patent Application No. 08161872 on Oct. 17, 2008.

* cited by examiner

EVENT MONITORING VIA COMBINATION OF SIGNALS

BACKGROUND OF THE INVENTION

The present invention relates to icing of wind turbines. More particularly, the invention relates to event monitoring or condition monitoring for wind turbines and an event monitoring unit. Specifically, the invention relates to methods for event monitoring for a wind turbine, an event monitoring unit and a computer program product for event monitoring.

In the past, wind turbines experience an increasing demand. Therefore, more and more wind turbines are also planned and erected at sites with conditions that are harsher. As an example, new sites for erecting wind turbines might have a higher probability of icing during the year. Further, the energy output continuously increases and therefore, as an example rotor blade diameters also increase in size. Accordingly, events like icing of rotor blades, fouling of rotor blades, erosion of rotor blades or other parts of the wind turbine, loosening of connection, and/or cracks within a rotor blade may occur. Commonly, such events have often been detected via direct measurements. Great effort has been undertaken in order to allow for more reliable direct measurement results to detect specific events that may occur during operation of a wind turbine. The detection of events like icing, fouling or other disfunctions are important to initialize appropriate countermeasures. As an example, a regulation to shut down the wind turbine in the event of ice-throw might be required.

Additionally, occurrence of events like icing, fouling of rotor blades, cracks in rotor blades or extensive stress of components of the wind turbine may reduce the energy output in the event no counter-measures or appropriate wind turbine control steps are taken.

The detection of the condition of a wind turbine with direct measurements may not result in a sufficient accuracy, since the measurement itself might not be sufficiently accurate or since the signal does not sufficiently correlate to the phenomenon to be detected.

SUMMARY OF THE INVENTION

In view of the above, it is desirable to have an improved event monitoring of a wind turbine. According to a first embodiment, a method for event monitoring for a wind turbine is provided. The method includes measuring a first signal pattern representing a characteristic selected from a characteristic group, the characteristic group consisting of: a mechanical characteristic of a wind turbine, emitted noise of a wind turbine, emitted noise of a part of a wind turbine; power output of a wind turbine, surface conductivity of parts of a wind turbine, operational data of a wind turbine, temperature of parts of a wind turbine, outside temperature, wind velocity, wind direction, and outside air humidity or other weather conditions; measuring at least a second signal pattern representing a different characteristic selected from the characteristic group; analyzing the first and the second signal pattern or a combination of the first and the second analyzed signal pattern with an analyzing method, wherein analyzed data is generated; and evaluating the analyzed data, wherein the evaluation provides a result indicative for an event.

According to another embodiment, a method for event monitoring for a wind turbine is provided. The method for event monitoring for a wind turbine includes: measuring a first signal pattern representing a characteristic selected from a characteristic group, the characteristic group consisting of: a natural frequency of a part of a wind turbine, emitted noise of a wind turbine, emitted noise of a part of a wind turbine; power output of a wind turbine, stress of a part of a wind turbine, load oscillation of a part of a wind turbine, relative position of parts of a wind turbine, surface conductivity of parts of a wind turbine, operational data of a wind turbine, temperature of parts of a wind turbine, outside temperature, wind velocity, wind direction, and outside air humidity or other weather conditions; measuring at least a second signal pattern representing a different characteristic selected from the characteristic group; analyzing the first and the second signal pattern or a combination of the first and the second analyzed signal pattern with an analyzing method, wherein analyzed data is generated; and evaluating the analyzed data, wherein the evaluation provides a result indicative for an event.

According to another embodiment, a method for event monitoring for a wind turbine is provided. The method for event monitoring for a wind turbine includes: measuring a first signal pattern representing a characteristic of a wind; measuring at least a second signal pattern representing a characteristic of a wind turbine; analyzing the first and the second signal pattern or a combination of the first and the second analyzed signal pattern, wherein analyzed data is generated, with at least an analyzing method of the group consisting of: rating or weighting of individual signals of the signal pattern, Fourier analysis, trend analysis, mapping of the signal pattern to curves with at least two parameters, analysis with neural networks or other self-learning methods. Rating or weighting can be performed by stability of measurement signals over time, space, or frequency domain. The method further includes evaluating the analyzed data, wherein the evaluation provides a result indicative for an event.

According to yet another embodiment an event monitoring unit for a wind turbine is provided. The event monitoring unit includes: a fist signal measuring unit adapted for measuring a first signal pattern representing a characteristic selected from a characteristic group, the characteristic group consisting of: a mechanical characteristic of a wind turbine, emitted noise of a wind turbine, emitted noise of a part of a wind turbine; power output of a wind turbine, surface conductivity of parts of a wind turbine, operational data of a wind turbine, temperature of parts of a wind turbine, outside temperature, wind velocity, wind direction, and outside air humidity or other weather conditions; a second signal measuring unit adapted for measuring at least a second signal pattern representing a different characteristic selected from the characteristic group; an analyzing unit connected to received the first signal pattern and the second signal pattern and adapted for analyzing the first and the second signal with analyzing method, wherein a first analyzed signal pattern and a second analyzed signal pattern is generated; and an evaluation unit adapted for evaluating at least the first and the second analyzed signal pattern, wherein the evaluation provides a result indicative for an event.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Figure 1A:
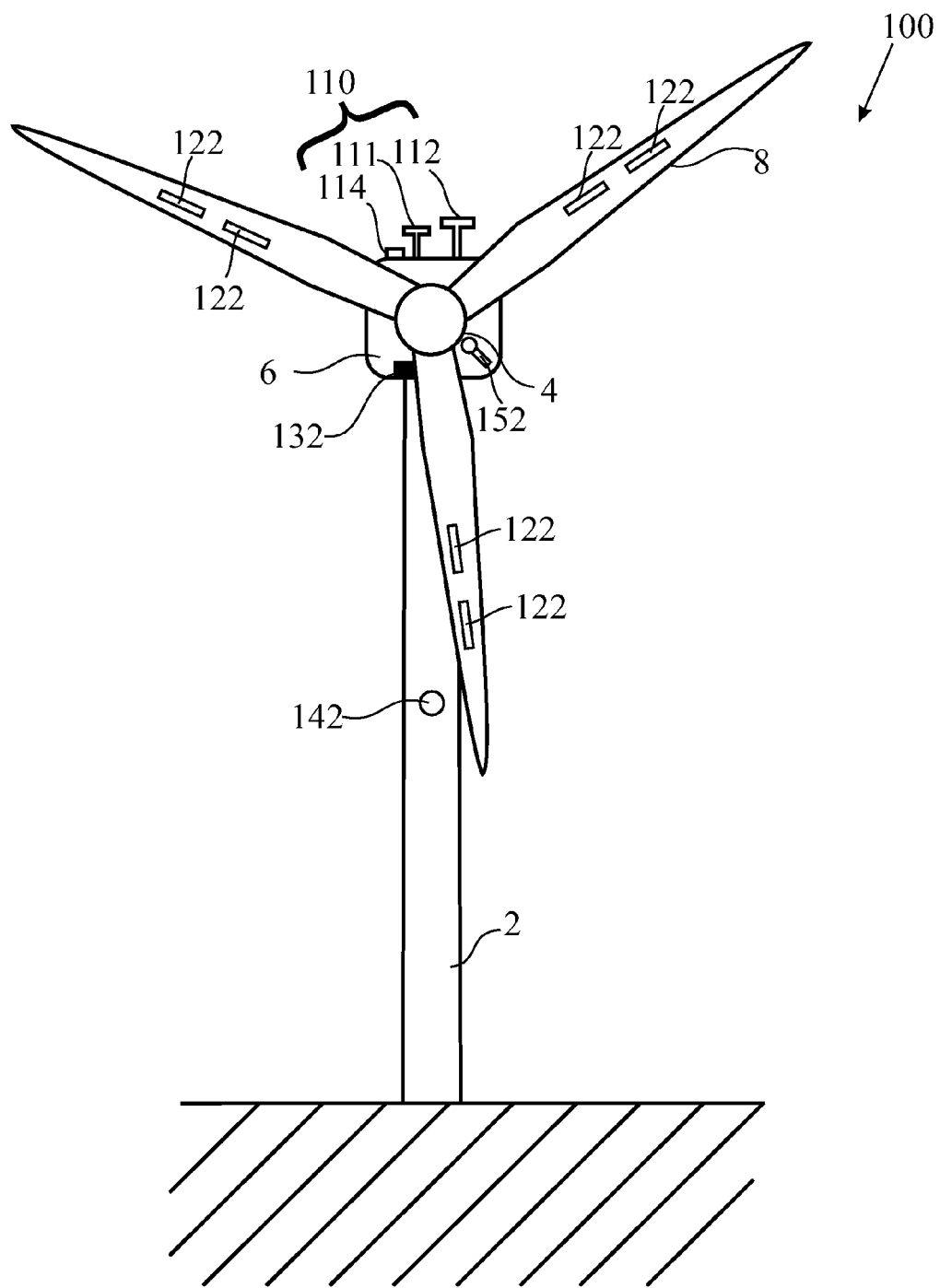
FIGS. 1a and 1b show a wind turbine according to embodiments described herein, wherein the plurality of signals are measured in order to generate signal patterns.

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

According to embodiments described herein, it is possible to correlate signals patterns to conditional deviations or to certain events of the wind turbine that can occur during operation of the wind turbine. Through a combination of signals monitoring of conditions or events of the wind turbine in an indirect way is possible.

According to further embodiments, a logical analyzer which correlates signal patterns to conditions or events may be based on a long-term or short-term history of the signal patterns of the wind turbine.

According to even further embodiments, a logical analyzer may analyze the signal patterns based on their stability, their drift over time, their space domain, their frequency domains, their long- and short-term trend, or a combination thereof. Thereby, according to different embodiments, signals patterns can be individually analyzed or a combination of signal patterns can be analyzed.

Commonly used wind turbines can include detection elements for a plurality of signals like wind speed, wind direction, power output, vibrations, mechanical stress in rotor blades and other parts of the wind turbine, air humidity, outside temperature and other weather conditions, and operational data like pitch activity, turbine power production operating temperatures of components, media and environment. FIG. 1 illustrates an embodiment wherein a wind turbine 100 is provided. A nacelle 6 is provided on top of the tower 2. The hub 4 is rotatably held at the nacelle 6. The rotor blades 8 are mounted to the nacelle 6. According to one embodiment, three rotor blades are provided. According to further embodiments more than three or less than three rotor blades can be provided. According to some embodiments described herein, the hub 4 is connected via a drive train 22 to the gear 24 and transfers the rotational energy to the generator 26.

Figure 1B:
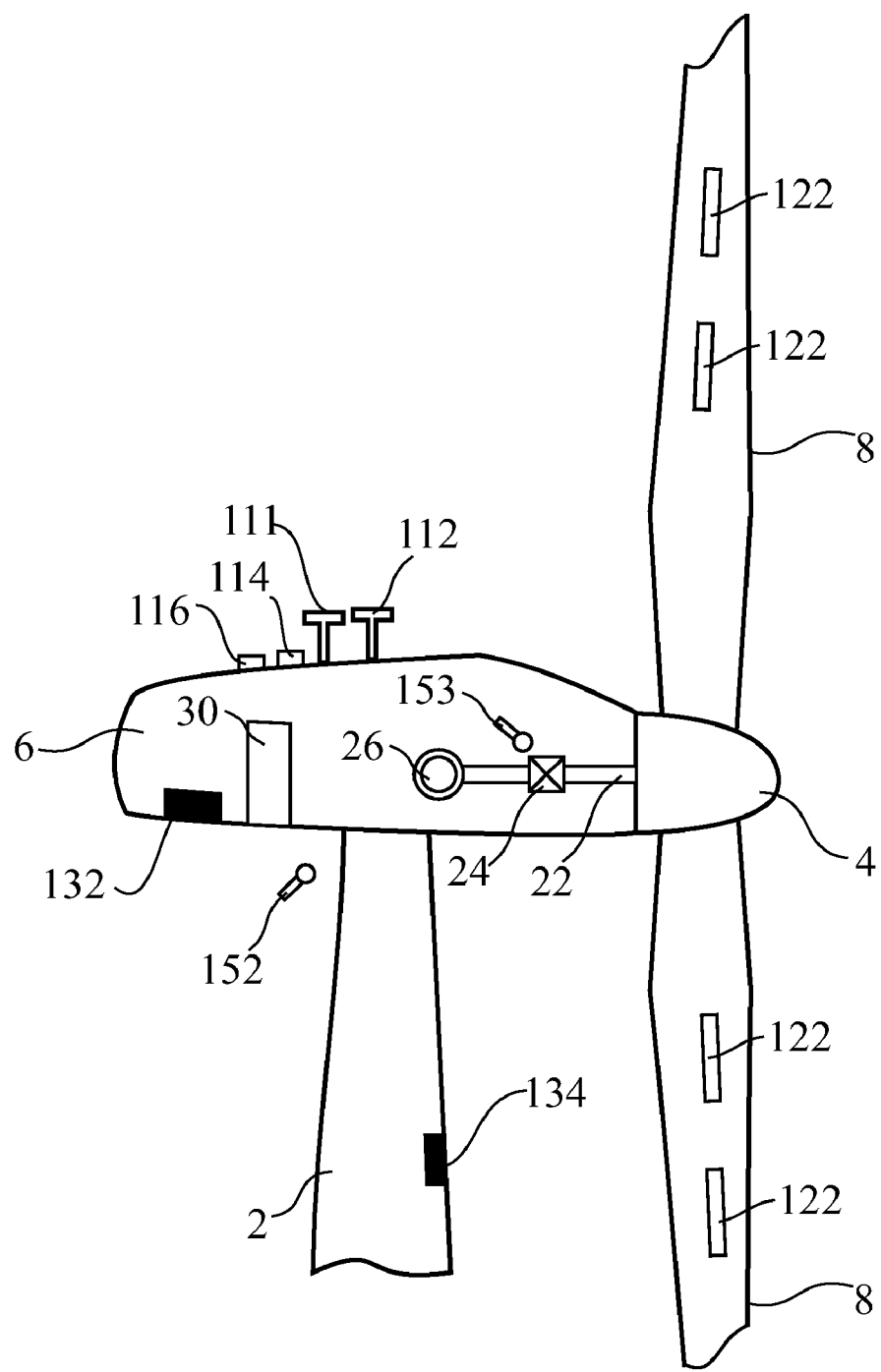

Within the wind turbine shown in FIGS. 1A and 1B a plurality of signals are generated. Any of these signals or the signal generation units can be combined arbitrarily in order to yield embodiments described herein.

FIG. 1A shows a first anemometer 111 and the second anemometer 112 as well as a temperature measuring unit 114. As a further example, FIG. 1B shows a humidity sensor 116 as part of the weather condition measuring system 110. These signal generation units are part of a weather condition measurement system 110. Each of these units measure the present weather condition over time and, thereby, measure signal patterns. The measuring units can transmit the measured signal pattern, e.g., to the control unit 30. (See FIG. 1B.)

According to further embodiments, which can be combined with any of the embodiments described herein, weather condition signal patterns may also be provided from an external source. Accordingly, remote weather conditions can be included in the event monitoring.

According to even further embodiments, strain gauges 122 are integrated in the rotor blades 8. The strain gauges 122 generate signals indicative of stress that is present in the rotor blades during operation. These signals are measured over time and, thereby generate signal patterns. According to even further embodiments, the stress in other portions of the wind turbine can be measured with strain gauges and corresponding signal patterns can be generated. The measuring units can transmit the measured signal pattern, e.g., to the control unit 30. (See FIG. 1B.)

According to yet further embodiments, one or more vibration sensors 132 can be provided in the nacelle 6. As shown in FIG. 1B vibration sensor 134 can also be provided in the tower of the wind turbine. The vibration sensors 132 and 134 measure vibrations of parts of the wind turbine. The signals are measured over time and, therefore, measure signal patterns.

The corresponding sensors 132 and 134 or other sensors located at different portions of the wind turbine, for example the tower root, a rotor blade, a rotating shaft or the gearbox, transmit mechanical variable data to the control unit 30 (see FIG. 1B.). Any of the corresponding signal patterns or combination thereof can be used for monitoring of an event or a condition of the wind turbine.

As shown in FIGS. 1A and 1B microphones 152 are installed next to the wind turbine or within the wind turbine in order to measure the emitted noise of the wind turbine or parts of the wind turbine. According to one embodiment, as shown in FIG. 1B, the microphone 153 is installed next to the gear 24. Thereby, the noise generated by the gear 24 can be measured with the microphone 153. According to other embodiments, a microphone can additionally or alternatively be installed next to other parts of the wind turbine. Yet according to other embodiments, alternatively or additionally, a microphone 152 can be installed in order to measure the noise emitted by the wind turbine in its entirety. The measuring units can transmit the measured signal pattern, e.g., to the control unit 30. (See FIG. 1B.)

FIG. 1A shows a distance measuring unit 142 which measures the distance between the tower of the wind turbine and the rotor blade. The signals representative for the distance between the tower two and the rotor blade 8 are measured over time and, therefore, signal pattern is generated.

A control unit 30 is installed within a nacelle 6. The control unit 30 receives a plurality of signal patterns, which are generated by the measuring units described above or other measuring units. The other measuring units can, according to even further embodiments described herein, include: a natural frequency of a part of a wind turbine, emitted noise of a wind turbine, emitted noise of a part of a wind turbine; power output of a wind turbine, stress of a part of a wind turbine, load oscillation of a part of a wind turbine, relative position of parts of a wind turbine in general, surface conductivity of parts of a wind turbine, operational data of a wind turbine, temperature of parts of a wind turbine, outside temperature, wind velocity, wind direction, and outside air humidity or other weather conditions.

As mentioned above, a plurality of signals can be measured within the wind turbine 100. Thereby, different embodiments can be yielded by a combination of at least two of the above-mentioned signals. The signal combination can be described as follows. According to one embodiment, the characteristics of the measured signal can include at least any of the following characteristics. There are mechanical parameters of the wind turbine. These mechanical parameters can be vibrations, load oscillations, stress, geometry information, natural frequencies of parts of the wind turbine or the like. Further, weather condition parameters can be measured. As an example, the wind speed, the outside air temperature, the humidity and the wind direction, air pressure or the like are parameters defining a weather condition. Further characteristics of the wind turbine can be operational data like wind turbine power production, pitch activity, operating temperature of components, media and the environment in portions of the wind turbine, or the like. A further group of characteristics refers to emitted noise of the wind turbine or the emitted noise of parts of the wind turbine, which can be measured by microphones 152 and 153. As described above, according to further embodiments, additional microphones can be provided. A further group of characteristics are electrical parameters. As an example, conductivity measurements on the surface of the wind turbine. This might for example be applied for the surface conductivity of the rotor blades 8.

According to embodiments described herein, at least two signal patterns are measured and provided for analysis. According to some embodiments, the at least two signal patterns can be indicative of different characteristics from a group of wind turbine characteristics. According to one embodiment, the first signal pattern can be from the first characteristic group consisting of a mechanical characteristic of a wind turbine, emitted noise of a wind turbine, emitted noise of a part of a wind turbine; power output of a wind turbine, surface conductivity of parts of a wind turbine, operational data of a wind turbine, temperature of parts of a wind turbine, outside temperature, wind velocity, wind direction, and outside air humidity or other weather conditions. The second signal pattern is from a different characteristic of the same first characteristic group.

According to yet another embodiment, the first signal pattern can be from the second characteristic group consisting of: a mechanical characteristic of a wind turbine, emitted noise of a wind turbine, emitted noise of a part of a wind turbine; power output of a wind turbine, surface conductivity of parts of a wind turbine, operational data of a wind turbine, temperature of parts of a wind turbine, outside temperature, wind velocity, wind direction, and outside air humidity or other weather conditions. The second signal pattern is a signal representing a different characteristic from the same second characteristic group.

Thereby, for the embodiments described herein the signal patterns used for analysis and evaluation for monitoring of an event of a wind turbine or a condition of a wind turbine are at least partly indirect signals, which do not directly correlate with the parameter to the measured. Herein, an indirect correlation is to be understood as explained with the following examples. For example, an anemometer measures the wind speed irrespective of the physical principle used for a wind speed measurement. Thus, the output signal of the anemometer is a wind velocity and/or wind direction signal. Therefore, an anemometer directly measures the wind speed. As a further example, if two similar measurements of two different anemometers are compared in order to monitor an icing condition, the comparison of the two anemometers refers to an icing condition of the different anemometers. Thus, the compared signal is again a direct signal for event of icing since an icing of the anemometers is judged. The condition is merely directly measured at a different location of the wind turbine (Icing of rotor blade versus icing of anemometer). Accordingly, an indirect signal as referred to herein relates to a measurement that is commonly not used for monitoring the event of the wind turbine or the condition of the wind turbine or a measurement that is not representing the same event for a different portion of the wind turbine.

Embodiments described herein measure signal patterns from different characteristic groups and/or signal patterns of indirect signals. The signal patterns are analyzed and the analyzed data is evaluated. The evaluation results in a detection of an event or a condition of the wind turbine. The signal pattern analysis allows for the generation of analyzed data, which is commonly not available for wind turbines. According to different embodiments, this analyzed data can be evaluated on a short-term and/or along-term basis. As an example, the analyzed data can be evaluated within a timeframe of minutes or hours. However, the analyzed data of the wind turbine as presently operated can also be evaluated with regard to the analyzed data of a similar time period of the previous year, a period when the turbine was new or a time period for which the event was not present. As an example, the evaluation for monitoring icing can be conducted in comparison to signal patterns generated during summer months during which icing can be excluded.

According to embodiments described herein, the plurality of signal patterns, which may be, for example, 5, 10, 20 signal patterns, or even more, are not only evaluated with regard to the present value. Commonly, signals of a wind turbine are often compared to a threshold value. This applies to individual measurement points, to averaged signals or moving averages of the signal. To the contrary, embodiments described herein can include an analysis beyond this simple evaluation of present signals or averages of the present signals.

According to some embodiments, the analysis of the signal patterns can be conducted individually for each signal pattern or can be conducted on a combination of signal patterns. According to one embodiment, the analysis can include the rating or weighting of one or more signal patterns. Thereby, for example, the stability of the signal pattern is evaluated and used for rating or weighting. Individual measurement points of the signal pattern can be rated as instable and, therefore, disregarded for the analyzed data set to be evaluated. Accordingly, the analyzed data is based on an analyzed signal pattern with a higher stability, which can be used for evaluation. According to another embodiment, individual measurement points of the signal pattern can also be weighted based on their stability. In the case instable measurement points have, e.g., a smaller weight, the analyzed data also reflects a higher stability. For the embodiments referring to the stability of measuring points, the judgment of stability can, for example, be conducted with regard to one or more neighboring measurement points. A time period of high fluctuations is not included in an evaluation of the analyzed data or is considered with a smaller weight.

According to further embodiments, which can be alternatively or additionally used, mapping of the signal patterns is conducted for analysis of the signal patterns. Thereby, the signal patterns are analyzed with regard to a plurality of parameters. That is, the signal pattern is analyzed as an at least two-dimensional curve, and the signal points can, for example, be interpolated in at least two dimensions. According to a further embodiment, at least four or at least six parameters are used for signal pattern mapping.

Accordingly, a signal pattern can be analysis based on another parameter, i.e., another measured signal. Therefore, additionally, to the time domain, space domain and frequency domain referred to in embodiments described herein, further embodiments can be yielded by analyzing a signal pattern as a function of a natural frequency of a part of a wind turbine, emitted noise of a wind turbine a signal pattern as a function of emitted noise of a part of a wind turbine; power output of a wind turbine, stress of a part of a wind turbine, load oscillation of a part of a wind turbine, relative position of parts of a wind turbine, surface conductivity of parts of a wind turbine, operational data of a wind turbine, temperature of parts of a wind turbine, outside temperature, wind velocity, wind direction, and outside air humidity or other weather conditions. Thereby, in additional to the time domain, the space domain and the frequency domain other "domains" can be used for analysing signal patterns.

According to further embodiments, the analysis of the signal patterns can include alternatively or additionally a trend analysis. Thereby, the signal pattern can be evaluated on a short-term or long-term basis and the analyzed data includes information regarding a trend or changes in the signal patterns. An analysis can thereby be conducted with regard to a status of the wind turbine when the wind turbine was newly erected or based on a time for which a certain event, for example, icing, is very unlikely (e.g., summer). Alternatively, a short-term analysis can be conducted.

According to even further embodiments, which can be used additionally or alternatively, the analysis method can include analysis methods that are self-learning. Thereby, as an example, artificial neural networks, fuzzy logic, multivariate analysis methods, machine learning or the like can be used. The analysis method can learn, e.g., based on an exemplary data set, for which it is known whether or not the condition or the event is present. Thereby, the learning data set includes signal pattern combinations of a plurality of signal pattern that are indicative of an event or a condition of the wind turbine. Generally, there are supervised, unsupervised, reinforced and other learning methods. The self-learning analysis can improve its monitoring accuracy over time and, thereby, can improve its monitoring accuracy of events.

According to even further embodiments, which may be combined with other analyzing methods, a Fourier transform can be provided for the signal patterns. As an example, a Fast Fourier transform (FFT) is conducted on the signal patterns to provide the analyzed data in the frequency domain. The analyzed data in the frequency domain can be evaluated or a further analysis method can be applied for the analyzed data in the frequency domain. Generally, according to yet further embodiments described herein, different analyzing methods can be combined. According to even further embodiments, an analysis method can be combined with an averaging or a threshold evaluation, which is described above and which is not considered an analysis method as defined herein.

According to different embodiments, which can be combined with any of the embodiments described herein, the analysis methods can be applied on individual signal pattern or a plurality of signal patterns. According to further embodiments, a plurality of signal patterns can be understood as including two signal patterns, five signal patterns or an even higher number of signal patterns. It is further optionally possible that groups of signal patterns are analyzed in combination such that the result of different signal pattern groups can be combined. As an example, a signal pattern indicative of a mechanical characteristic of the wind turbine can be analyzed in combination with a signal pattern indicative for emitted noise. Additionally, the signal pattern indicative of the emitted noise can be analyzed in combination with a signal pattern indicative for a weather condition signal. Thereafter, the two analyzed data patterns can be further analyzed and or evaluated together.

As one example, the first signal pattern indicative of the wind speed and the second signal pattern indicative for the power output are analyzed together. The two signal patterns can be analyzed by rating the stability of the combination of the two signal patterns in order to generate a power curve including stability analysis. The analyzed data, that is a stabilized power curve can then be evaluated for monitoring whether or not an event like icing, fouling, cracks, erosion, loosening of bolted or other connections, temperature control problems or the like are present or not. According to one embodiment, the stability of, for example, the power output is rated or weighted, e.g., in the time domain, to derive a curve with increased probability. Thereby, only an abstracted curve is proved as analyzed data for evaluation. As an example the abstracted analyzed data can than be compared to a pre-set curve. According to even further embodiments, which can be combined with other embodiments described herein, the pre-set curve can be parameterized for different parameters like air density, air temperature, other weather conditions, and/or parameters related to the condition or operation of the wind turbine.

The embodiments described herein do not suffer from direct data processing, which is difficult since the accuracy of the individual measuring points may be low. By a combination of a set of inputs, that is at least two signal patterns, into a logical analyzer an improved correlation to conditional deviations of the wind turbine can be realized. An analysis can thereby be conducted with regard to a status of the wind turbine when the wind turbine was newly erected or based on a time for which a certain event, for example, icing, is very unlikely (e.g., summer). Alternatively, a short-term analysis can be conducted.

Generally, a signal pattern used according to embodiments described herein may each for themselves not provide sufficient reliability for determining the event or the condition, but the combination of the information of the plurality of signal patterns increases the likelihood for a correct event monitoring. According to different embodiments, which can be combined with any of the embodiments described herein, the analysis methods can be conducted during normal operation of a wind turbine or triggered by a signal for example a warning signal, a fault signal, or even after the event has occurred. According to yet further embodiments, the analysis can be done locally by the wind turbine controller, the supervisory comment and data acquisition tool (SCADA) of the wind turbine, the supervisory comment and data acquisition tool of the wind park, or remotely.

According to further embodiments, the plurality of signal patterns which are analyzed for providing analyzed data for an evaluation for event monitoring may also be provided by different wind turbines in a wind turbine park. It will be well understood by a person skilled in the art, that one or more of the signal patterns used for analysis can be measured in a different wind turbine if a wind turbine park is provided. Thus, the embodiments described herein can yield further embodiments by combining individual signal patterns or group of signal patterns from different wind turbines.

Figure 2:
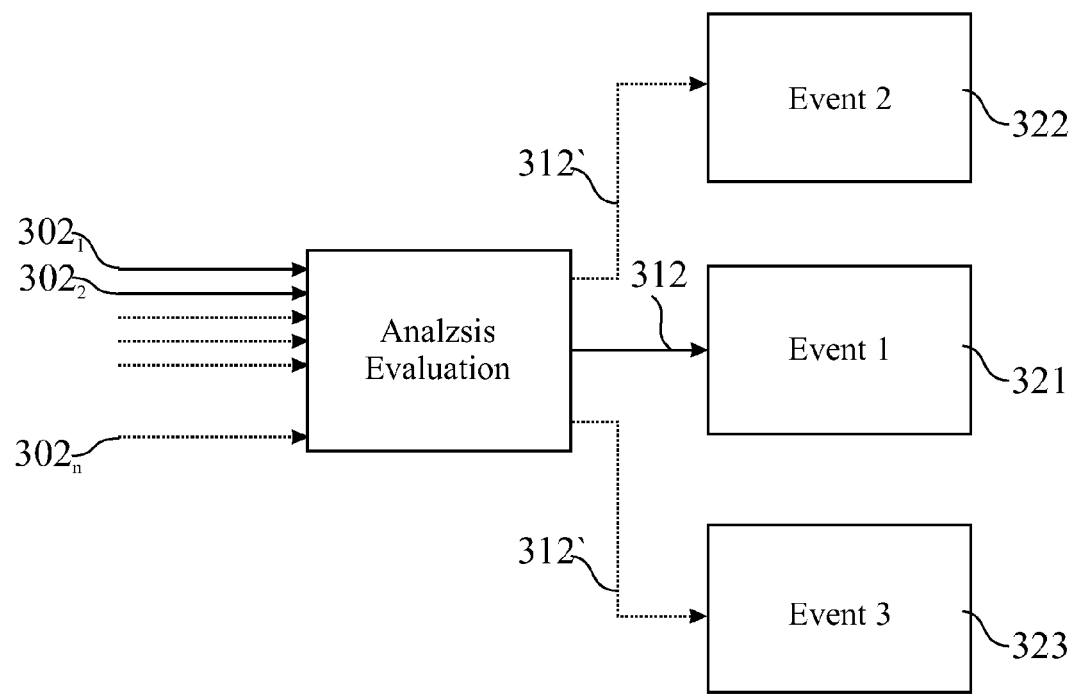
FIG. 2 shows a schematic view of methods of monitoring an event according to embodiments described herein.

As shown in FIG. 2, the method for monitoring an event or condition of the wind turbine includes the input of a plurality of signals $302_1$, $302_2$ ... $302_n$. The plurality of signals is provided for analysis and evaluation (step 310) to a controller, SCADA, or a remote location. As an example, FIG. 1B shows controller 30 which receives signals from the measuring units provided in the wind turbine. Based on the analysis of the signal patterns and evaluation of the analyzed data, an event is monitored as shown in step 321. As indicated by the arrow 312 and the dashed arrow 312', optionally more than one event can be monitored based on the measured signal patterns in step 322 and 323.

Generally, according to embodiments described herein, the described methods can be conducted by an appropriate software tool. Thereby, the controller, the SCADA or the remote location is provided with the computer program product, which can conduct any of the embodiments described above.

According to embodiments described herein a method for event monitoring for a wind turbine is provided. The method includes measuring a first signal pattern representing a characteristic selected from a characteristic group, the characteristic group consisting of: a mechanical characteristic of a wind turbine, emitted noise of a wind turbine, emitted noise of a part of a wind turbine; power output of a wind turbine, surface conductivity of parts of a wind turbine, operational data of a wind turbine, temperature of parts of a wind turbine, outside temperature, wind velocity, wind direction, and outside air humidity or other weather conditions; measuring at least a second signal pattern representing a different characteristic selected from the characteristic group; analyzing the first and the second signal pattern or a combination of the first and the second analyzed signal pattern with an analyzing method, wherein analyzed data is generated; and evaluating the analyzed data, wherein the evaluation provides a result indicative for an event. Thereby, it is possible that the evaluating includes evaluating the first and the second signal pattern and a combination of the first and the second analyzed signal pattern. According to some embodiments, the analyzing method includes at least one method selected from the group of: analyzing the stability over time; rating or weighting of signals, Fourier-analysis, long-term trend analysis, short-term trend analysis, mapping to curves, neural net analysis or other self-learning methods, and fuzzy logic. Thereby, the analyzing method can be conducted in time domain, space domain, or frequency domain.

According to further embodiments one or more event/condition can be monitored. For example, the event can be at least an event is selected from the group consisting of: icing, structural integrity of parts of the wind turbine, fouling or erosion of rotor blades of the wind turbine; loosening of connections, problems in temperature control.

Generally, it is possible for some embodiments described herein that the first and/or the second signal pattern are not directly correlated to the event condition. According to an embodiment, measuring at least five signal patterns representing a characteristic selected from the characteristic group can be provided. Therein, the analyzing includes analyzing the five signal patterns with analyzing method, and wherein the evaluating includes analyzing the at least five analyzed signal patterns.

According to another embodiment a method for event monitoring for a wind turbine is provided. The method includes measuring a first signal pattern representing a characteristic selected from a characteristic group, measuring at least a second signal pattern representing a characteristic selected from the characteristic group; analyzing the first and the second signal pattern or a combination of the first and the second analyzed signal pattern, wherein analyzed data is generated, with at least an analyzing method of the group consisting of: rating or weighting of individual signals of the signal pattern, Fourier analysis; trend analysis; mapping of the signal pattern to curves with at least two parameters; analysis with neural networks or other self-learning methods; and evaluating the analyzed data, wherein the evaluation provides a result indicative for an event. According to a further embodiment, it is optionally possible that the characteristic group consist of: a natural frequency of a part of a wind turbine, emitted noise of a wind turbine, emitted noise of a part of a wind turbine; power output of a wind turbine, stress of a part of a wind turbine, load oscillation of a part of a wind turbine, relative position of parts of a wind turbine, surface conductivity of parts of a wind turbine, operational data of a wind turbine, temperature of parts of a wind turbine, outside temperature, wind velocity, wind direction, and outside air humidity or other weather conditions.

According to yet further embodiments, which might be alternatively or additionally provided the evaluating includes evaluating of the first and the second signal pattern and a combination of the first and the second analyzed signal pattern. As a further additional or alternative option the analyzing method is conducted in time domain, space domain, or frequency domain.

According to another embodiment, an event monitoring unit for a wind turbine is provided. The unit includes a fist signal measuring unit adapted for measuring a first signal pattern representing a characteristic selected from a characteristic group, the characteristic group consisting of: a natural frequency of a part of the wind turbine, emitted noise of the wind turbine or a part of the wind turbine; power output of the wind turbine, stress of a part of a wind turbine, load oscillation of a part of the wind turbine, relative position of parts of the wind turbine, surface conductivity of parts of the wind turbine, operational data, temperature of parts of the wind turbine, outside temperature, wind velocity, wind direction, and outside air humidity or other weather conditions; a second signal measuring unit adapted for measuring at least a second signal pattern representing a different characteristic selected from the characteristic group; an analyzing unit connected to received the first signal pattern and the second signal pattern and adapted for analyzing the first and the second signal with analyzing method, wherein a first analyzed signal pattern and a second analyzed signal pattern is generated; an evaluation unit adapted for evaluating at least the first and the second analyzed signal pattern, wherein the evaluation provides a result indicative for an event.

Further embodiments are directed to wind turbines for conducting the disclosed methods or including embodiments relating to the monitoring units.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A method for monitoring an event of a wind turbine park, the method comprising the steps of:

using a first signal measuring unit to measure a first signal pattern representing a first characteristic selected from a characteristic group, the characteristic group comprising: a mechanical characteristic of a wind turbine of the wind turbine park, emitted noise of the wind turbine, emitted noise of a part of the wind turbine, power output of the wind turbine, surface conductivity of a part of the wind turbine, operational data of the wind turbine, temperature of a part of the wind turbine, outside temperature, wind velocity, wind direction, outside air humidity, and other weather conditions relating to the wind turbine;

using a second signal measuring unit to measure a second signal pattern representing a second characteristic selected from the characteristic group, wherein the second characteristic is different from the first characteristic;

analyzing the first signal pattern and the second signal pattern with an analyzing method to generate analyzed data; and evaluating the analyzed data to detect an event of the wind turbine park, wherein the first signal pattern is provided by the wind turbine and the second signal pattern is provided by at least another wind turbine of the wind turbine park.

2. The method according to claim 1, wherein the analyzing method comprises at least one of: analyzing stability over time, rating or weighting of signals, rating or weighting by stability, Fourier-analysis, long-term trend analysis, short-term trend analysis, mapping to curves, neural net analysis or other self-learning methods, and fuzzy logic.

3. The method according to claim 2, wherein the analyzing method is conducted in time domain, space domain, or frequency domain.

4. The method according to claim 2, wherein the analyzing method includes rating or weighting the stability of the power output in the time domain to derive a power curve with increased probability.

5. The method according to claim 1, wherein the step of evaluating the analyzed data includes evaluating the analyzed first signal pattern and the analyzed second signal pattern.

6. The method according to claim 1, wherein the event monitored comprises at least one of: icing, structural integrity of parts of the wind turbine, fouling or erosion of rotor blades of the wind turbine, loosening of connections, and problems in temperature control.

7. The method according to claim 1, wherein at least two events are monitored based on the first signal pattern and the second signal pattern.

8. The method according to claim 1, wherein the first signal pattern and the second signal pattern are not directly correlated to the event.

9. The method according to claim 1, further comprising:
measuring at least five signal patterns representing characteristics selected from the characteristic group, wherein the step of analyzing includes analyzing the five signal patterns with an analyzing method, and wherein the step of evaluating includes evaluating the at least five analyzed signal patterns.

10. A non-transitory computer readable medium encoded with a computer program product for conducting a method for monitoring an event of a wind turbine park according to claim 1.

11. A method for monitoring an event of a wind turbine park, the method comprising the steps of:
using a first signal measuring unit to measure a first signal pattern representing a first characteristic selected from a characteristic group;
using a second signal measuring unit to measure a second signal pattern representing a second characteristic selected from the characteristic group, wherein the second characteristic is different from the first characteristic;
analyzing the first signal pattern and the second signal pattern with an analyzing method to generate analyzed data, wherein the analyzing method comprises at least one of: rating or weighting of individual signals of the signal pattern, stability analysis, Fourier analysis, trend analysis, mapping of the signal pattern to curves with at least two parameters, and analysis with neural networks or other self-learning methods; and
evaluating the analyzed data to detect an event of the wind turbine park,
wherein the first signal pattern is provided by a wind turbine of the wind turbine park and the second signal pattern is provided by at least another wind turbine of the wind turbine park.

12. The method according to claim 11, wherein the step of evaluating the analyzed data includes evaluating the analyzed first signal pattern and the analyzed second signal pattern.

13. The method according to claim 12, wherein the analyzing method is conducted in time domain, space domain, or frequency domain.

14. The method according to claim 11, wherein the characteristic group comprises: a natural frequency of a part of the wind turbine, emitted noise of the wind turbine, emitted noise of a part of the wind turbine, power output of the wind turbine, stress of a part of the wind turbine, load oscillation of a part of the wind turbine, relative position of parts of the wind turbine, surface conductivity of a part of the wind turbine, operational data of the wind turbine, temperature of parts of the wind turbine, outside temperature, wind velocity, wind direction, outside air humidity, and other weather conditions relating to the wind turbine.

15. The method according to claim 11, wherein the event monitored comprises at least one of: icing, structural integrity of parts of the wind turbine, fouling or erosion of rotor blades of the wind turbine, loosening of connections, and problems in temperature control.

16. The method according to claim 11, wherein at least two independent events are monitored based on the first signal pattern and the second signal pattern.

17. The method according to claim 11, further comprising:
measuring at least five signal patterns representing characteristics selected from the characteristic group, wherein the step of analyzing includes analyzing the five signal patterns with an analyzing method, and wherein the step of evaluating includes evaluating the at least five analyzed signal patterns.

18. A non-transitory computer readable medium encoded with a computer program product for conducting a method for monitoring an event of a wind turbine park, according to claim 11.

19. An event monitoring unit for a wind turbine park, comprising:
a first signal measuring unit adapted for measuring a first signal pattern representing a first characteristic selected from a characteristic group, the characteristic group comprising: a natural frequency of a part of a wind turbine of the wind turbine park, emitted noise of the wind turbine or a part of the wind turbine, power output of the wind turbine, stress of a part of a wind turbine, load oscillation of a part of the wind turbine, relative position of parts of the wind turbine, surface conductivity of parts of the wind turbine, operational data, temperature of parts of the wind turbine, outside temperature, wind velocity, wind direction, outside air humidity, and other weather conditions relating to the wind turbine;
a second signal measuring unit adapted for measuring a second signal pattern representing a second characteristic selected from the characteristic group, wherein the second characteristic is different from the first characteristic;

an analyzing unit connected to receive the first signal pattern and the second signal pattern and adapted for analyzing the first signal pattern and the second signal pattern with an analyzing method, wherein a first analyzed signal pattern and a second analyzed signal pattern are generated; and an evaluation unit adapted for evaluating the first analyzed signal pattern and the second analyzed signal pattern to detect an event of the wind turbine park, wherein the first signal pattern is provided by the wind turbine and the second signal pattern is provided by at least another wind turbine of the wind turbine park.

20. The event monitoring unit according to claim 19, wherein at least one of the first signal measuring unit and the second signal measuring unit is a microphone.

21. A wind turbine park comprising:

an event monitoring unit according to claim 19.

* * * * *